United States Patent [19]

Yanke

[11] 4,108,015
[45] Aug. 22, 1978

[54] FULL TORQUE DIFFERENTIAL SYSTEM

[75] Inventor: James N. Yanke, Bellingham, Wash.

[73] Assignee: The Raymond Lee Organization, Inc., New York, N.Y. ; a part interest

[21] Appl. No.: 809,374

[22] Filed: Jun. 23, 1977

[51] Int. Cl.² .............................. F16H 1/12; F16H 1/20
[52] U.S. Cl. .................................................. 74/421 A
[58] Field of Search .................. 74/421 A, 792, 412 R

[56] References Cited

U.S. PATENT DOCUMENTS 3,153,158  10/1964  Schmitter ........................ 74/421 A X Primary Examiner—Leonard H. Gerin
Attorney, Agent, or Firm—Daniel Jay Tick

[57] ABSTRACT

The armature shaft of a motor is coaxially freely rotatably mounted in a cylindrical motor frame which is coaxially freely rotatably mounted in a cylindrical full torque frame. An annular gear is coaxially mounted in the motor frame. A power output shaft is rotatably mounted in a partition in the full torque frame perpendicular to the axis of the armature shaft and spaced from and parallel to a base end of the full torque frame. The power output shaft is also rotatably mounted in the base end of the full torque frame and extends in spaced parallel relation with the armature shaft to the outside of the full torque frame. A first gear is coaxially affixed to, and rotatable with, the armature shaft. A second gear is coaxially affixed to, and rotatable with, the power output shaft and is coupled to the first gear. A third gear is coaxially affixed to, and rotatable with, the power output shaft in spaced relation with the second gear and is coupled to the annular gear whereby mechanical power is applied from the annular gear to the output shaft via the third gear and power produced by the motor is applied from the first gear to the output shaft via the second gear so that all the motor torque is applied to the output shaft and essentially no torque to the full torque frame.

2 Claims, 3 Drawing Figures

U.S. Patent   Aug. 22, 1978   4,108,015
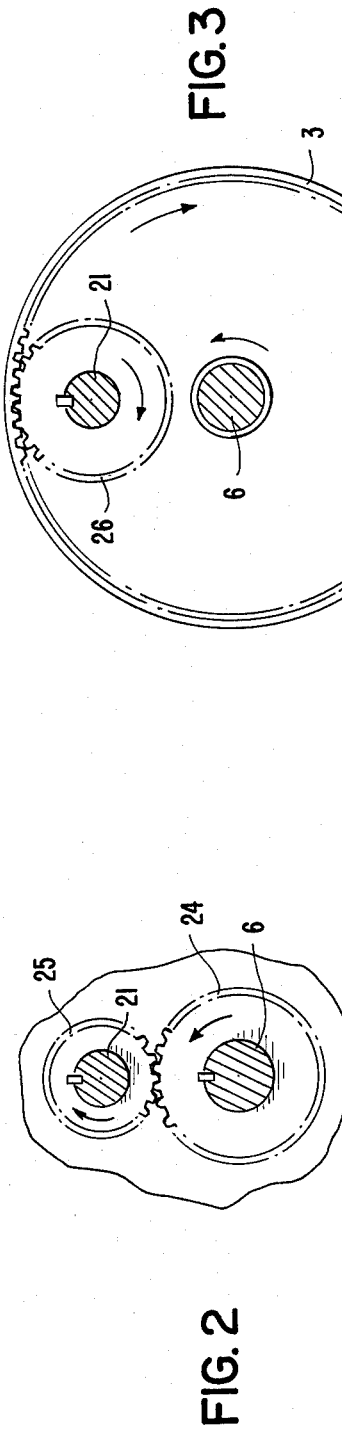
FIG. 2
FIG. 3
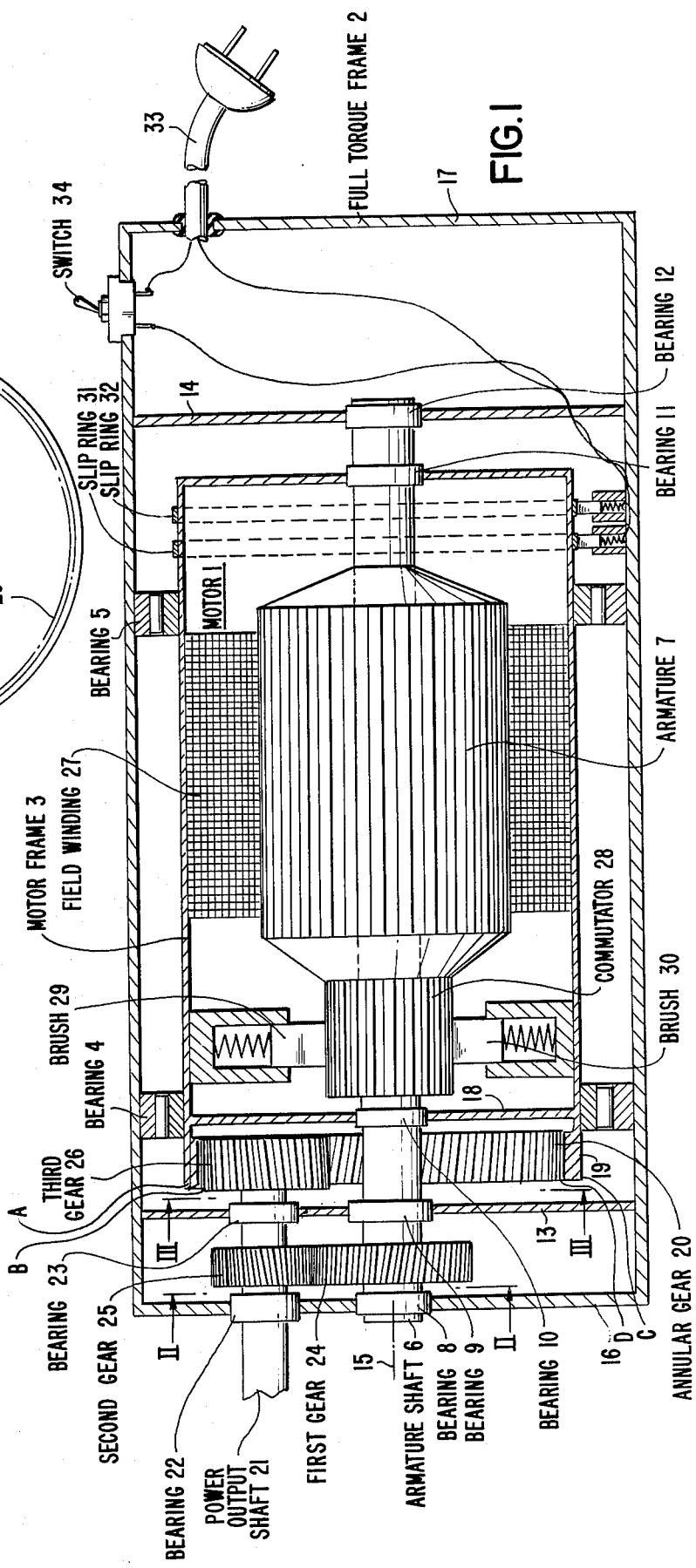
FIG. 1

FULL TORQUE DIFFERENTIAL SYSTEM

BACKGROUND OF THE INVENTION

The present invention relates to a full torque differential system for utilizing all forward and backward torques of an electric motor to produce a forward output torque.

Electrically powered hand drills are built in a manner whereby the user has to supply just as much force to hold the drill and prevent it from rotating backward, as the drill motor develops power to rotate the bit forward. The more strenuously the user drills, the greater energy he must exert to hold the drill steady and prevent it from rotating backwards. It requires considerably greater strength on the part of the user to prevent the drill from rotating backwards than it does to maintain the drill steady and exert forward pressure.

Objects of the invention are to provide a full torque differential system of simple structure, which is inexpensive in manufacture, used with facility and convenience, installed with facility and convenience in any sized hand-held equipment, and functions efficiently, effectively and reliably to apply all the motor torques, whether forward or backward, to produce a forward output torque thereby permitting the use of electric power drills of considerably greater power due to permitting the user to utilize all his strength to maintain the drill steady and eliminating any requirement for exerting strength to prevent the drill from rotating backwards.

BRIEF DESCRIPTION OF THE DRAWINGS

In order that the invention may be readily carried into effect, it will now be described with reference to the accompanying drawings, wherein:

FIG. 1 is a view, partly in section, of an embodiment of the full torque differential system of the invention;

FIG. 2 is a view, partly in section, taken along the lines II—II, of FIG. 1; and FIG. 3 is a view, partly in section, taken along the lines III—III, of FIG. 1

DETAILED DESCRIPTION OF THE INVENTION

The full torque differential system of the invention utilizes all forward and backward torques of an electric motor 1 to produce a forward output torque.

The full torque differential system comprises a full torque frame 2 of substantially cylindrical configuration (FIG. 1).

A motor frame 3 of substantially cylindrical configuration is coaxially freely rotatably mounted in the full torque frame 2 via bearings 4 and 5, as shown in FIG. 1.

The electric motor 1 has an armature shaft 6 (FIGS. 1 to 3) coaxially freely rotatably mounted in the motor frame 3 and an armature 7 coaxially mounted on the armature shaft (FIG. 1). The armature shaft 6 is rotatably mounted via bearings 8, 9, 10, 11 and 12.

The bearing 8 is mounted in a base end of the full torque frame 2. The bearings 9 and 12 are mounted in partitions 13 and 14, respectively, in the full torque frame 2 extending substantially perpendicular to the axis 15 of the armature shaft 6 and spaced from, and parallel to, the base ends 16 and 17, respectively, of said full torque frame. The bearing 10 is mounted in a partition 18 in the motor frame 3, extending substantially perpendicular to the axis 15 of the armature shaft 6 and spaced from, and parallel to, a base end 19 of said motor frame. The bearings 8 to 12 are centrally mounted relative to the full torque frame 2. That is, they are coaxially mounted with the full torque frame 2.

An annular gear 20 (FIGS. 1 and 3) is coaxially mounted in the motor frame 3 at the base end 19.

A power output shaft 21 (FIGS. 1 to 3) is rotatably mounted in the partition 13 and in the base end 16 of the full torque frame 2 and extends in spaced parallel relation with the armature shaft 6. The power output shaft 21 extends outside the full torque frame 2.

The power output shaft 21 is rotatably mounted via a bearing 22 mounted in the base end 16 of the full torque frame 2 and a bearing 23 mounted in the partition 13 of said full torque frame.

A first gear 24 is coaxially affixed to, and rotatable with, the armature shaft 6 (FIGS. 1 and 2).

A second gear 25 is coaxially affixed to, and rotatable with, the power output shaft 21 and is coupled to the first gear 24, as shown in FIGS. 1 and 2.

A third gear 26 is coaxially affixed to, and rotatable with, the power output shaft 21, as shown in FIGS. 1 to 3, in spaced relation with the second gear 25, and is coupled to the annular gear 20.

The ratio of the annular gear 20 to the third gear 26 equals the ratio of the first gear 24 to the second gear 25.

Mechanical power is applied from the annular gear 20 to the output shaft 21 via the third gear 26 and power produced by the motor 1 is applied from the first gear 24 to said output shaft via the second gear 25. Thus, all the motor torque is applied to the output shaft 21 and essentially no torque is applied to the full torque frame 2.

The electric motor 1 has the usual field winding 27, commutator 28, brushes 29 and 30 and slip rings 31 and 32. The motor 1 is powered by electrical energy supplied from a commercial power source via electrical conductors 33 and an ON/OFF switch 34 connected to the slip rings 31 and 32 in the usual manner.

While the invention has been described by means of a specific example and in a specific embodiment, I do not wish to be limited thereto, for obvious modifications will occur to those skilled in the art without departing from the spirit and scope of the invention.

I claim:

1. A full torque differential system for utilizing all forward and backward torques of an electric motor to produce a forward output torque, said full torque differential system comprising a full torque frame of substantially cylindrical configuration;

a motor frame of substantially cylindrical configuration coaxially freely rotatably mounted in the full torque frame;

a motor having an armature shaft coaxially freely rotatably mounted in the motor frame and an armature coaxially mounted on the armature shaft;

an annular gear coaxially mounted in the motor frame;

a partition in the full torque frame substantially perpendicular to the axis of the armature shaft and spaced from and parallel to a base end of said full torque frame;

a power output shaft rotatably mounted in the partition and base end of the full torque frame and extending in spaced parallel relation with the armature shaft, said power output shaft extending outside said full torque frame;

a first gear coaxially affixed to and rotatable with the armature shaft;

a second gear coaxially affixed to and rotatable with the power output shaft and coupled to the first gear; and a third gear coaxially affixed to and rotatable with the power output shaft in spaced relation with the second gear and coupled to the annular gear whereby mechanical power is applied from the annular gear to the output shaft via the third gear and power produced by the motor is applied from the first gear to the output shaft via the second gear so that all the motor torque is applied to the output shaft and essentially no torque is applied to the full torque frame.

2. A full torque differential system as claimed in claim 1, wherein the ratio of the annular gear to the third gear equals the ratio of the first gear to the second gear.

* * * * *